July 15, 1958   G. BERTAUX   2,843,694
REMOTE CONTROL CABLES
Filed Aug. 30, 1954
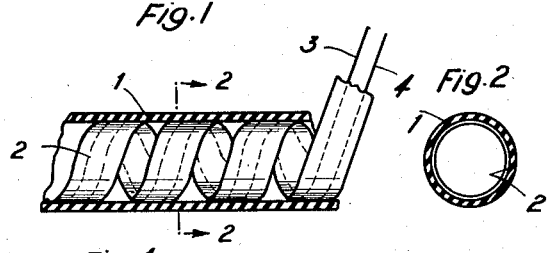
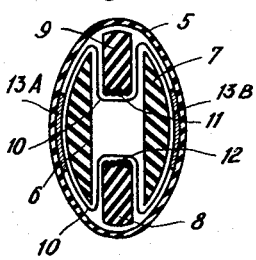
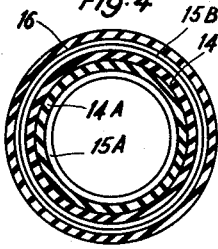
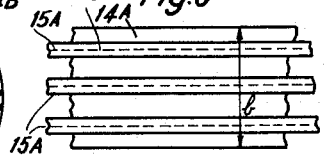
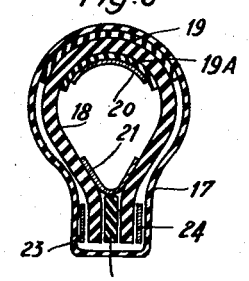
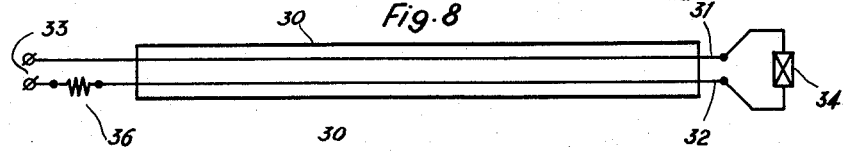
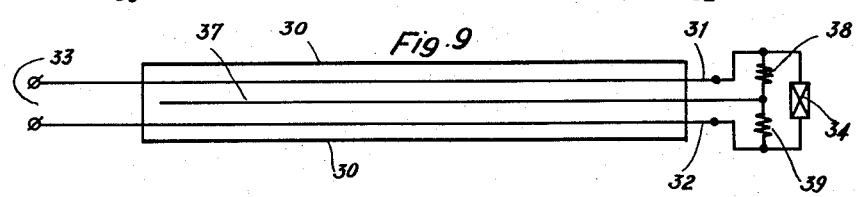
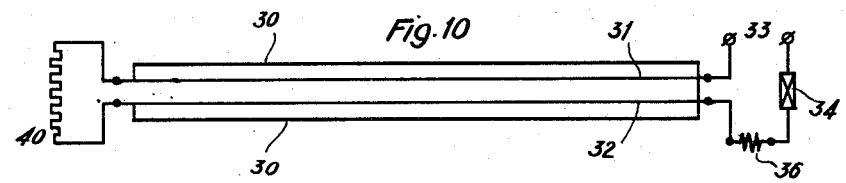
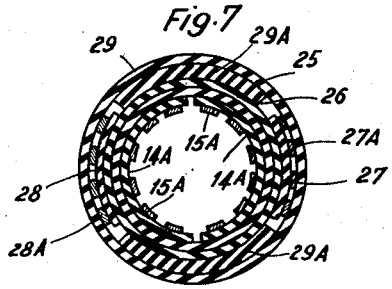

United States Patent Office 2,843,694
Patented July 15, 1958

2,843,694

REMOTE CONTROL CABLES

Gérard Bertaux, Jeumont, France, assignor to Forges et Ateliers de Constructions Electriques de Jeumont, Paris, France, a corporation of France Application August 30, 1954, Serial No. 452,968

Claims priority, application France September 11, 1953

4 Claims. (Cl. 200—86)

The present invention relates to improvements in remote control cables of the multi-conductor type.

Remote control cables may be used for many purposes, for example to open, close, or change the characteristics of, a circuit when the cable is squeezed or otherwise distorted at any point along its length. The circuit may, for example, be used to actuate signalling, indicating or protective devices or to start, stop or otherwise control equipment of various kinds. It is an object of the invention to provide an improved remote control cable that is sensitive to predetermined pressure to actuate a circuit connected to, and including, the cable. The term "actuate" is herein used to mean opening, closing, or changing the characteristics of, the circuit.

In some applications, it is desirable for the cable to be sensitive only to particular kinds of deformation. For example, if the control cable is lying on the ground or floor, it may be undesirable for it to be actuated by pressure resulting from a person stepping on the cable or by a vehicle running over it. According to a preferred embodiment of the invention, the cable is actuated by being pressed in a particular way but is not sensitive to other pressure or deformation.

The remote control cables in accordance with the invention comprise a flexible sheath and one or more strips or tapes of non-conductive material disposed longitudinally or helically inside the sheath and carrying a plurality of flexible electric conductors. The strips or tapes serve as supports for the flexible conductors and as guiding, localizing and protecting means. The flexible conductors may consist of wires or metallic deposits which are suitably fixed on their supports by weaving or otherwise. In accordance with a preferred form of the invention, the conductors comprise flexible braids suitably attached to their supports, for example by stapling or sewing.

The flexible conductors carried by the strips or tapes inside the sheath are normally spaced and hence out of contact with one another. When the cable is collapsed, bent or otherwise deformed in a predetermined manner, the conductors are brought into contact with one another, the conductors being, at least in part, bare so that they make electrical contact when they touch.

In addition to remote control conductors adapted to be brought into contact with one another by deformation of the cable, the cables may have additional conductors which are insulated and are not at any time brought into contact with one another.

The nature and advantages of the invention will be more fully understood from the following description and claims in conjunction with the accompanying drawings which show several preferred embodiments of the invention. In the drawings:

Fig. 1 is a longitudinal view, partially in section and partially in perspective, showing a remote control cable of circular cross section.

Fig. 2 is a cross section of the cable of Fig. 1 taken on the line 2—2

Fig. 3 is a cross section of a remote control cable of elliptical cross section.

Fig. 4 is a cross section of a remote control cable having control conductors and additional insulated conductors.

Fig. 5 is a fragmentary view of a tape and attached conductors used in the control cable of Fig. 4.

Fig. 6 is a cross section of another form of control cable which is approximately pear-shaped in cross section.

Fig. 7 is a cross section of another form of remote control cable that is circular in cross section and comprises a plurality of control conductors and also additional conductors.

Figs. 8, 9 and 10 are circuit diagrams representing schematically circuits including control cables in accordance with the invention.

In Figs. 1 and 2, there is shown a control cable of circular cross section comprising a tight, flexible sheath 1 of insulating material on the inside of which there is a helically wound tape 2. The sheath 1 is preferably formed of rubber, plastic or other suitable material that is sufficiently flexible to permit the cable to be collapsed locally and sufficiently resilient normally to retain its circular shape and to restore such shape when a force causing deformation of the cable is removed. The tape 2 is made of flexible, non-conducting material, for example fabric, paper or plastic, and carries a plurality of flexible metallic conductors, two such conductors being shown by way of example in the drawings and numbered 3 and 4. The metallic conductors 3, 4 may be attached to the insulating tape 2 in various ways. For example, if the tape 2 is formed of woven material, the metallic conductors may be woven into the tape, as indicated by the broken lines in Fig. 1. Alternatively, the conductors may be sewed to the tape, as described below and illustrated in Fig. 5, or they may be fastened by stapling. If the tape 2 is made of smooth insulating material, the conductors may be formed of metallic paint or other metallizing composition applied to the tape in any suitable manner, for example by spraying, painting or printing.

The conductors 3 and 4 are at least partially exposed on the inner face of the tape 2. In the normal condition of the cable, as illustrated in Figs. 1 and 2, the conductors 3 and 4 are spaced, and hence electrically insulated from one another. However, if the cable is flattened at any point along its length, for example by being squeezed or sharply bent, portions of each conductor are brought into contact with diametrically opposite portions of the other conductor, thereby making electrical contact between the two conductors. If the cable is suitably connected into a control circuit, for example as illustrated in Figs. 8, 9 and 10 and described below, the bringing of conductors 3 and 4 into contact with one another results in producing a signal or several successive signals or otherwise actuating the control circuit. As the cable shown in Figs. 1 and 2 is symmetrical, it will be actuated by predetermined pressure in any direction transverse of the cable.

In Fig. 3, there is shown a remote control cable that can be actuated by force exerted in a predetermined direction but is not actuated by forces acting in other directions. The cable comprises a flexible, insulating, and preferably fluidtight sheath 5 of substantially oval or elliptical cross section, the larger diameter of which is herein referred to as the major axis and the shorter diameter is referred to as the minor axis. Inside the sheath 5, there are two spaced longitudinal strips 6 and 7 of elastic insulating material, the cross section of these strips being preferably similar to that of a plane-convex lens. The strips 6 and 7 are arranged so that their flat faces are approximately parallel to one another and to the major axis of the ellipse. Between the strips 6 and 7, there are inserted strips or pieces 8 and 9 which are spaced from one another and disposed at the opposite ends of the major axis. The strips 8 and 9 are shown as being of approximately rectangular cross section although their outer portions are preferably rounded to conform to the cross section of the sheath 5. They are held in place between the strips 6 and 7 by a helically wound tape 10 which passes outside the strips 6 and 7 and inside of the strips 8 and 9. The strips 8 and 9, like strips 6 and 7, are formed of flexible and elastic insulating material, for example a relatively soft rubber composition. The tape 10 may be similar to, or identical with, the tape 2 of Figs. 1 and 2 and may carry two or more flexible remote control conductors such as conductors 3 and 4 (Fig. 1). It is wound in adjoining spirals so that the distances between the parallel conductors remain small.

Alternatively, as illustrated in Fig. 3, the control conductors comprise longitudinally extending metallic conductors 11 and 12 fixed in any suitable manner on the opposed inner faces of the insulating strips 8 and 9 or completely surrounding these strips. The tape 10 in this embodiment is preferably narrow and wound in spaced spirals so that substantial portions of the conductors 11 and 12 are exposed. The conductors 11 and 12 are illustrated as being metallic braids suitably secured to the strips 8 and 9, for example by staples or adhesive. Alternatively, the conductors 11 and 12 may consist of metallic layers deposited on the strips 8 and 9 by painting, spraying or dipping or in any other suitable manner.

If the cable of Fig. 3 is compressed in the direction of its minor axis, the strips 6 and 7 are brought together but these strips are formed of insulating material and no electrical contact is established between the conductors 11 and 12. However, if the cable is compressed in the direction of its major axis, the strips 8 and 9 guided by the strips 6 and 7 come into contact with one another, thereby establishing electrical contact between the control conductors 11 and 12. Alternatively, if the tape 10 carries conductors like the conductors 3 and 4 on the tape 2 shown in Figs. 1 and 2, these conductors are brought into electrical contact with one another by compression of the cable in the direction of its major axis.

Experience has shown that, if an oval cable like that of Fig. 3 is laid on the ground, it tends to lie flat so that, if it is compressed by being stepped on or by a vehicle running over it, the compression is in the direction of the minor axis of the cable and no contact is made between the control conductors. Even if the cable is laid on the ground in a twisted condition so that portions of the cable have their major axes in a vertical position, the cable tends to turn under pressure so as to lie flat on the ground and hence pressure on the cable is in line with its minor axis and hence does not make contact between the control conductors. Finally, if the cable is bent sharply, it always tends to bend flatwise so that the cable is compressed in the direction of its minor axis and the control conductors are not brought into contact with one another. Hence, it is only by intentionally squeezing or otherwise applying pressure to the cable in the direction of its major axis that the control conductors are brought into contact and the control circuit is thereby actuated. Inadvertent actuation of the circuit is thus effectively avoided. To facilitate the operation of the cable, it is preferably made with a maximum diameter of 3 to 5 centimeters so that it can be held comfortably in the hand and can be easily manipulated.

In addition to the remote control conductors 11 and 12, the cable illustrated in Fig. 3 is shown as having conductors 13A and 13B which are suitably insulated so that they are prevented from coming into contact with the control conductors or with one another. These additional conductors may serve to feed other circuits through the same cable, for example lighting, telephone, or signalling circuits. The conductors 13A and 13B are shown as being placed between the outer insulating sheath 5 and the inserts 6 and 7 and may be in the form of flexible strips of foil, thin metallic braids or metallized strips, so as not to impair the flexibility and deformability of the cable.

In Fig. 4, there is shown a cable of circular cross section somewhat similar to that of Fig. 1 but having additional insulated conductors which are not brought into contact with the control conductors or with each other by deformation of the cable and are of such nature that they do not interfere with the control functions of the cable. The cable shown in Fig. 4 comprises an insulating tape 14A formed, for example, of rubber and helically wound in contiguous spirals to form an inner tube which carries on its inner face a plurality of conductors 15A. As shown in greater detail in Fig. 5, the strip 14A, having a width $b$, carries a plurality of conductive braids 15A formed of cotton threads and wires braided together and flattened. The braids 15A are spaced apart and extend longitudinally of the insulating strip 14A, being secured to the strip in any suitable manner, for example by stitching or sewing as indicated at 16A. The stitching or sewing of the braids 15A to the strip 14A has the important advantages of strength, ease of manufacture and absence of adhesives that might cover the metallic surfaces and thus impair the quality of the electrical contacts when the braids are brought into engagement with one another by distortion of the cable. There may be any desired number of braids 15A on the insulating strip 14A and they may be connected separately or in groups to the various poles of the circuits which are to be fed or controlled by the remote control cable.

It should be noted that, if the braids 15A are sewn directly to the elastic support 14A formed, for example of vulcanized or unvulcanized rubber composition, tapes of great elasticity in all directions will be obtained. If, for any reason, it is desired to obtain a non-stretchable or less stretchable tape, a strip of non-stretchable or stretch-resistant fabric or other insulating material may be placed between the braids 15A and their support 14A.

Outside the helically wound tape 14A of the cable shown in Fig. 4, there is wound a second tape 14B which is likewise helically wound with contiguous convolutions and carries on its outer face one or more conductive braids 15B. The two tapes 14A and 14B are wound back to back and preferably in opposite directions and are cemented or vulcanized together. The conductors 15A are thus on the inner face of the inner strip 14A while the conductors 15B are on the outer face of the outer strip 14B. The tubular structure thus formed is covered by a flexible, and preferably fluidtight, insulating sheath 16 similar to the sheath 1 of Figs. 1 and 2 and the sheath 5 of Fig. 3.

In the cable of Fig. 4, the conductive braids 15A are disposed as spaced helices on the inside of the inner tube formed by the helically wound strip 14A and constitute remote control conductors. When the cable is squeezed, twisted or folded, the braids 15A are brought into contact with one another. The braids 15B extend as spaced helices around the outer tube formed by the helically wound strip 14B and are insulated by the strip 14B and the sheath 16 so that, even when the cable is squeezed, twisted, folded or otherwise deformed, they do not come into contact with one another or with the control conductors 15A. The conductors 15B are hence usable as additional conductors like the conductors 13A and 13B of Fig. 3.

In Fig. 6, there is shown a control cable of non-circular and somewhat pear-shaped cross section comprising a flexible, fluidtight, insulating sheath 17 enclosing a strip 18 of vulcanized rubber or similar material, folded longitudinally so as to form a substantially closed U. Where the strip 18 is folded, it is preferably reinforced by strips 19 and 19A of fabric, leather, rubber or other suitable material. Conductor tapes 20 and 21 are secured to the interior of the cable in any suitable way in diametrically opposite position. These conductor tapes may consist of foil or metallized surfaces or may be braids with a structure analogous to that of Fig. 5. They serve as remote control conductors, as will be explained below.

The edge portions of the longitudinally folded insulating strip 18 are separated by an insulating strip 22 formed, for example, of cotton braid. On the outer faces of the longitudinal edge portions of strip 18, there are placed tapes 23 and 24 similar to the tape 14A of Fig. 5, to provide the cable with additional conductors.

When the cable of Fig. 6 is compressed in the direction of its large diameter, the flexible conductors 20 and 21 are brought into contact with one another so as to actuate a control circuit connected to these conductors. However, if the cable is compressed in the direction of its shorter diameter, there is no contact between the control conductors 20 and 21. In neither event are the additional conductors provided by the tapes 23 and 24 brought into contact with one another or with the control conductors.

It will be appreciated that the cross sectional shape of the forms of cable shown in Figs. 3 and 6 can be modified as desired. For example, the cable of Fig. 3 can be made substantially rectangular by modifying the cross sectional shape of the inserts 6 and 7 and the size of the elements 8 and 9. Likewise, in Fig. 6, the cross sectional shape of the cable may be modified by varying the size of the separating strip 22. If the dimensions and rigidities of the various elements constituting such a cable of rectangular cross section are suitably chosen, the cable can be given greater flexibility in the direction of the compression which produces the closing of the contacts while avoiding the closing of the contacts when the cable is twisted.

In Fig. 7, there is shown a cable of circular cross section comprising two or more strips 14A similar to that shown in Fig. 5 and each carrying a plurality of conductive braids 15A. The strips 14A are bent longitudinally so as to have an arcuate cross section and extend longitudinally inside a tubular envelope 25 which may, if desired, be encased in a further envelope 26, as shown. The envelopes 25 and 26 are formed by helically wound insulating strips, the strips being preferably wound in opposite directions and cemented or vulcanized together. On the outside of the envelope 26, there are placed two longitudinally extending strips 27 and 28 which are also similar to the strip 14A of Fig. 5 and carry conductors 27A and 28A. The whole is enclosed in an elastic and fluidtight outer sheath 29, suitable spacing strips 29A being inserted between the sheath and the envelope 26 to fill the space between the conductor-carrying strips 27 and 28.

The inner conductors 15A serve as control conductors and are selectively brought into contact with one another by compression of the cable. The control conductors are grouped and connected to the external circuit in any desired manner so as to form one or more remote control circuits. The direction in which the cable must be compressed to operate the desired control circuit or cuits may be suitably indicated, for example by means of differently colored lines or stripes on the outer sheath 29. The conductors 27A and 28A are used as additional conductors and do not come into contact with the control conductors or with each other. They may hence constitute one or more non-controlled circuits. It will be understood that, instead of extending longitudinally as shown in Fig. 7, the strips 27 and 28 may be wound helically like the strips 14B of Fig. 4. Likewise, other features of the several embodiments shown in Figs. 1 to 7 are mutually interchangeable.

In using the cables in accordance with the invention, the remote control conductors are preferably connected so as to present the maximum degree of safety. Figs. 8 to 10 show, by way of example, circuit diagrams illustrating the use of remote control cables in accordance with the invention. These figures show only the connections of the remote control conductors, the additional conductors such as conductors 13A and 13B of Fig. 3 being omitted in order to simplify the drawing. The circuits shown in Figs. 8 to 10 have the desirable characteristic of immediately indicating any accidental break or interruption in the remote control connection.

In Fig. 8, there is shown diagrammatically a cable having a sheath 30 and two remote control conductors 31 and 32. These conductors are connected between a current source 33 and a device 34 which may be a relay, lamp, signal, motor, etc. The device 34 is normally energized by current from the source 33. When the conductors 31 and 32 are brought into contact with one another, for example by squeezing the control cable, the device 34 is deenergized. As a safety measure, there may be inserted in the control circuit a minimum current relay 36, the armature of which is normally attracted. In the case of accidental rupture of one of the conductors, the armature of the relay 36 falls, giving an alarm signal or producing a desired safety operation or indication.

In Fig. 9, there is shown a control cable having a sheath 30 and two conductors 31 and 32 connecting a device 34 to a current source 33, as in Fig. 8. However, in this embodiment, the cable also has a third conductor 37 which is connected to the center point of a relay which has two coils 38 and 39. These two coils are opposed to one another and the effect of one normally cancels out that of the other. However, if one of the wires, for example wire 31, is cut or broken, current is supplied to one only of the coils 38 and 39 so that the relay attracts its armature and gives an alarm signal or produces other indication or operation.

Fig. 10 illustrates a circuit in which the device 34 is normally deenergized and is energized by contact of the control conductors in the cable. In this circuit, the device 34 is connected in series with a high impedance 40 which permits the flow of only a weak current that is insufficient to operate the device 34 but sufficient to energize a minimum current relay 36. If contact is established between conductors 31 and 32 of the cable, for example by squeezing or bending the cable, the resistance 40 is shunted out and the current is sufficient to energize the device 34. If one of the conductors 31 and 32 or connecting wires is broken or cut, the minimum current relay 36 drops and produces a safety operation or indication.

It will be understood that the control cables and circuits herein described are non-limiting examples of the invention and that they can be modified, combined or altered in various ways without departing from the scope of the invention.

What I claim and desire to secure by Letters Patent is:

1. A cable comprising a deformable sheath, at least one helically wound insulating tape disposed within said sheath, a plurality of flexible bare conductors arranged as contact members having the form of conducting braids comprising non-conducting threads intermixed with metallic wires, said braids having a flattened cross-section and being directly attached on one side of said tape by sewing thereon, whereby said tape is effective to maintain volutes of said conducting braids in spaced relationship from each other a distance such that no electrical contact is provided therebetween and disposed within said outer sheath so that deformation imparted to said cable will cause at least portions of said conducting braids to contact each other.

2. A cable comprising a deformable outer sheath a first narrow insulating tape helically wound within said sheath, a first plurality of flexible bare conductors comprising non-conducting threads and metallic wires and attached to said tape by sewing thereon, a second plurality of flexible bare conductors disposed within said sheath for acting as contact members and insulated from said first plurality of conductors, a second insulating tape for carrying said second plurality of conductors sewn thereon, said first plurality of conductors being carried by said helically wound insulating tape being spaced from each other an amount such that no electrical interconnection is provided therebetween and disposed within said outer sheath so that a deformation imparted to said cable will cause said first plurality of conductors to come into contact with each other, said second plurality of conductors being connected for signalling and being insulated from each other in a normal position of said cable and remaining insulated when said deformation is applied to said cable, said first and second tapes being wound and disposed in back-to-back relationship.

3. A cable comprising an outer sheath, a plurality of flexible bare conductors insulated from one another, and disposed within said sheath as contact members, said conductors being formed by flat braids of non-conducting threads and metallic wires, and another plurality of conductors, inner insulating elements, at least a part of each which is formed by helically wound insulating tapes carrying said conductors which are attached thereto by sewing and spaced from each other an amount such that no electrical interconnection is provided therebetween and disposed within said outer sheath so that a deformation imparted to said cable will cause said conductors to enter into contact with each other at least partially along their length and said tapes being wound in back-to-back relationship.

4. A cable according to claim 3 in which said flexible conductors and said insulating elements are disposed in a selected geometrical relationship such that only deformations of said cable along selected radii are effective in producing electrical interconnections of said flexible conductors by physical contact therebetween.

References Cited in the file of this patent

UNITED STATES PATENTS

| | | |
|---|---|---|
| 683,341 | Shaw | Sept. 24, 1901 |
| 2,132,685 | Hampton et al. | Oct. 11, 1938 |
| 2,138,549 | Bell | Nov. 29, 1938 |
| 2,181,728 | Greentree | Nov. 28, 1939 |
| 2,437,969 | Paul | Mar. 16, 1948 |
| 2,735,907 | Inman | Feb. 21, 1956 |

FOREIGN PATENTS

| | | |
|---|---|---|
| 274,148 | Great Britain | June 18, 1927 |
| 465,069 | Great Britain | Apr. 30, 1937 |